(12) United States Patent
Li et al.

(10) Patent No.: US 8,296,350 B2
(45) Date of Patent: Oct. 23, 2012

(54) METHOD AND APPARATUS FOR QR-FACTORIZING MATRIX ON MULTIPROCESSOR SYSTEM

(75) Inventors: Hui Li, Beijing (CN); Bai Ling Wang, WeiHai (CN)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 12/402,780

(22) Filed: Mar. 12, 2009

(65) Prior Publication Data

US 2009/0235049 A1    Sep. 17, 2009

(30) Foreign Application Priority Data

Mar. 14, 2008    (CN) .......................... 2008 1 0086073

(51) Int. Cl.
*G06F 15/80* (2006.01)
*G06F 9/302* (2006.01)
*G06F 17/16* (2006.01)
*G06F 9/00* (2006.01)

(52) U.S. Cl. ........ 708/520; 708/200; 708/446; 708/521; 712/30; 712/221

(58) Field of Classification Search .......................... None
See application file for complete search history.

(56) References Cited

U.S. PATENT DOCUMENTS

| 6,357,041 B1 | 3/2002 | Pingali et al. |
| 7,028,168 B2 | 4/2006 | Wadleigh |
| 7,729,889 B2 * | 6/2010 | Barford .......................... 702/191 |
| 8,200,726 B2 * | 6/2012 | Gustavson et al. ........... 708/200 |
| 2009/0216821 A1 * | 8/2009 | Nakamura et al. ............ 708/446 |

OTHER PUBLICATIONS

James Demmel et al., "ST-HEC: Reliable and Scalable Software for Linear Algebra Computations on High End Computers," 2005.*
Kurzak et al., "QR factorization for the cell broadbank engine," IOS Press Amsterfam, The Netherlands, vol. 17, Issue 1-2, Jan. 2009.*
Yamamoto, Y.; "Performance Modeling and Optimal Block Size Selection for a BLAS-3 Based Tridiagonalization Algorithm"; Proceedings of the Eighth International Conference on High-Performance Computing in Asia-Pacific Region (HPCASIA'05); 2005; pp. 1-8; IEEE Computer Society.

* cited by examiner

*Primary Examiner* — Tammara Peyton
(74) *Attorney, Agent, or Firm* — Suiter Swantz pc llo

(57) ABSTRACT

The present invention provides a method and apparatus for QR-factorizing matrix on a multiprocessor system, wherein the multiprocessor system comprises at least one core processor and a plurality of accelerators, the method comprises the steps of: iteratively factorizing each panel in the matrix until the whole matrix is factorized; wherein in each iteration, the method comprises: partitioning an unprocessed matrix part in the matrix into a plurality of blocks according to a predetermined block size; partitioning a current processed panel in the unprocessed matrix part into at least two sub panels, wherein the current processed panel is composed of a plurality of blocks; and performing QR factorization one by one on the at least two sub panels with the plurality of accelerators, and updating the data of the sub panel(s) on which no QR factorization has been performed among the at least two sub panels by using the factorization result. The present invention enables a multiprocessor system having a high computing capability to be applied to the matrix QR factorization having a large amount of computation tasks.

8 Claims, 12 Drawing Sheets

```
for k=1;  k min(m,n)/n_b ; k ++
do
    1. DGEQR2: Compute the QR factorization on an m'*n_b panel of A
       for i=1; i ≤ n_b; i ++
       do
           DLARFG: generate the elementary reflector V_t and τ_i
           DLARF: update the trailing submatrix
       end
    2. DLARFT: Compute the triangular factor T of the block reflector
       Q=(I−VTV^T);
    3. DLARFB: Apply Q^T to the rest of the matrix from the left
```

$$\begin{pmatrix} R_{12} \\ \widetilde{A}_{22} \end{pmatrix} = Q^T \begin{pmatrix} A_{12} \\ A_{22} \end{pmatrix} = (I - VT^T V^T) \begin{pmatrix} A_{12} \\ A_{22} \end{pmatrix}$$

DGEMM:  $W = V' \begin{pmatrix} A_{12} \\ A_{22} \end{pmatrix}$

DTRMM:  $W = V^T W$

DGEMM:  $\begin{pmatrix} R_{12} \\ \widetilde{A}_{22} \end{pmatrix} = \begin{pmatrix} A_{12} \\ A_{22} \end{pmatrix} - VW$ end

*FIG. 1c*

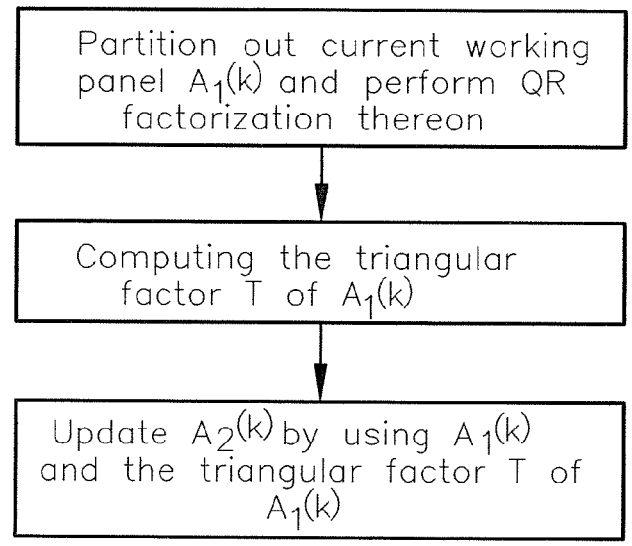

METHOD AND APPARATUS FOR QR-FACTORIZING MATRIX ON MULTIPROCESSOR SYSTEM

CROSS-REFERENCE TO RELATED APPLICATIONS

The present application claims the benefit under 35 U.S.C. §119 of China; Application Serial Number 200810086073.1, filed Mar. 14, 2008 entitled "Method and Apparatus for QR-Factorizing Matrix on a Multiprocessor System" which is incorporated herein by reference.

TECHNICAL FIELD

The present invention relates to the data processing field, in particular to a method and apparatus for QR-factorizing matrix on a multiprocessor system.

TECHNICAL BACKGROUND

Linear Algebra PACKage (LAPACK) is a very efficient and robust world-wide-used linear algebra function library jointly developed by Oak Ridge National Lab, Davis branch of California University and Illinois University, for solving numerical linear algebra problems highly effectively in various high performance computing environments. It has served the HPC (High Performance Computing) and Computational Science community remarkably well for twenty years. See http://netlib.amss.ac.cn/lapack/index.html for the detail of the LAPACK.

As a professional linear algebra library, LAPACK provides various linear algebra subroutines, including the routine for implementing the QR factorization of matrix.

The meaning of QR factorization of matrix is: for a given M×N matrix A, seeking the factorization:

$$A = Q * R,$$

where Q is an M×M orthogonal matrix, and R is an M×N upper triangular matrix.

The existing QR factorization routine in LAPACK is implemented according to a panel QR factorization solution, which is a blocked factorization solution.

FIG. 1 is an illustration of the existing panel QR factorization solution, wherein FIGS. 1(a) and (b) are the overall and stepped illustrations of $k^{th}$ iteration computation in the existing panel QR factorization solution, respectively, and FIG. 1(c) is a description of the algorithm of the existing panel QR factorization solution. FIG. 2 is a flowchart of the existing panel QR factorization solution.

Generally, as shown in FIG. 1(a), the idea of the existing panel QR factorization solution is that, for a given M×N matrix A, iteratively, factorization operation is performed on one panel of the matrix at one time, to finally factorize the matrix A into the product of an M×M matrix Q and an M×N upper triangular matrix R. For simplicity in the present invention, the matrix A is illustrated as a square matrix in the figures. In fact, the matrix A in the figures may be an arbitrary M×N matrix instead of the square matrix, wherein M and N are unequal positive integers. By taking an iteration therein as an example, as shown on the left side of FIG. 1(a), the matrix parts V and R in light grey are ones factorized through the $1^{th} \sim (k-1)^{th}$ iteration operations, while the matrix part in dark grey combined by the matrix parts $A_1^{(k)}$ and $A_2^{(k)}$ is not factorized and is also the object of the $k^{th}$ (k=1, 2, 3 . . . ) iteration operation. Further, in the $k^{th}$ iteration operation, the matrix part in dark grey is partitioned into two panels $A_1^{(k)}$ and $A_2^{(k)}$, where $A_1^{(k)}$ is the current working panel; then an QR factorization computation is performed on the current working panel $A_1^{(k)}$, and $A_2^{(k)}$ is updated by using the result of the factorization computation, thus the matrix on the right side of FIG. 1(a) is obtained. Therein, in the matrix on the right side of FIG. 1(a), the matrix part $\tilde{A}_2^{(k)}$ in dark grey becomes the factorization object for the $(k+1)^{th}$ iteration operation.

Specifically, as shown in FIGS. 1(b), (c) and FIG. 2, in the existing panel QR factorization solution, for a given M×N matrix A, partition is performed first to partition it into m×n blocks, where each block is $N_b \times N_b$ such as 32×32 in size, then the following steps 1-3 will be performed in the $k^{th}$ (k=1, 2, 3 . . . ) iteration operation according to:

$$A^{(k)} = \left( A_1^{(k)} \ A_2^{(k)} \right)$$
$$= \begin{pmatrix} A_{11} & A_{12} \\ A_{21} & A_{22} \end{pmatrix}$$
$$= Q \cdot \begin{pmatrix} R_{11} & R_{12} \\ 0 & R_{22} \end{pmatrix}$$

At step 1, a panel $A_1^{(k)}$ composed of $m \times n_b$ blocks is partitioned out from the object matrix $A^{(k)}$ of the iteration operation this time as the current working panel, and the QR factorization computation is performed on the current working panel $A_1^{(k)}$ to factor it into a V part and an R part;

at step 2, the triangular factor T of the current working panel $A_1^{(k)}$ is calculated based on the computation result of step 1; and at step 3, the current working panel $A_1^{(k)}$ and the triangular factor T of $A_1^{(k)}$ are applied to the rest matrix part $A_2^{(k)}$ of $A^{(k)}$ to update its data. LAPACK only outputs matrixes V and R, and the user can compute on the matrix V to obtain matrix Q, thus completing the QR factorization.

FIG. 3 shows a process of QR-factorizing a matrix partitioned into 3×3 blocks with the above existing panel QR factorization solution (a case of only one time iteration). Therein as shown in FIG. 3(a), at step 1, QR factorization is performed on the current working panel of 3×1 blocks on the left of the matrix; as shown in FIG. 3(b), at step 2, the triangular factor $T_k$ of the current working panel is calculated; as shown in FIG. 3(c), the rest matrix part of 3×2 blocks is updated by using the current working panel and the triangular factor $T_k$.

There will be a lot of matrix-multiply operations in the QR factorization routine designed based on the above existing panel QR factorization solution, for such routine, performance is very critical.

The Cell Broadband Engine (CBE) is a single-chip multiprocessor system. As shown in FIG. 4, the CBE system has 9 processors operating on a shared, coherent memory, including a Power Processing Unit (PPU) and 8 Synergistic Processing units (SPU). Under such system architecture, the CBE can provide outstanding computing capability. Specifically, the Cell processor is capable of achieving 204 Gflops/sec when clocked at 3.2 GHz. Having such a high computing capability, CBE is obviously an ideal running platform for matrix QR factorization having a large amount of computation tasks.

However the above existing panel QR factorization solution is designed for a single-processor system. If it is directly applied to such a multiprocessor system as CBE, there will be a memory bandwidth limitation problem. The reason is as follows. In CBE, the capacity of the local memory of each SPU is 256K, thus in the case of a large data size exceeding 256K, it is needed to execute read in/read out operations repetitively between a main memory and the local memory of the SPU by way of DMA. For example, in the case that the matrix is partitioned into a plurality of blocks each in the size of 32×32, if the above existing panel QR factorization solution is implemented for the matrix on 8 SPUs of the CBE, then the maximum memory requirement will be 20.6 GB/second. However, QS20 and QS21 blade in the CBE is only capable of sustaining roughly a memory bandwidth of 20.5 GB/second. So the memory bandwidth becomes a bottle neck for the above existing panel QR factorization solution to be applied to a multiprocessor system like CBE to improve the performance of QR factorization. Therefore, there is a need for designing a QR factorization solution suitable for a multiprocessor system like CBE.

SUMMARY OF THE INVENTION

In view of the above problem, the present invention provides a method and apparatus for QR-factorizing matrix on a multiprocessor system so as to perform matrix QR factorization operation having a large amount of computation tasks by using such a multiprocessor system as CBE, thus bringing the advantages of the high computation capability possessed by such a multiprocessor system into play.

According to one aspect of the present invention, there is provided a method for QR-factorizing matrix on a multiprocessor system, wherein the multiprocessor system comprises at least one core processor and a plurality of accelerators, the method comprising the step of: iteratively factorizing each panel in the matrix until the whole matrix is factorized; wherein in each iteration, the method comprises: partitioning an unprocessed matrix part in the matrix into a plurality of blocks according to a predetermined block size; partitioning a current processed panel in the unprocessed matrix part into at least two sub panels, wherein the current processed panel is composed of a plurality of blocks; and performing QR factorization one by one on the at least two sub panels with the plurality of accelerators, and updating the data of the sub panel(s) on which no QR factorization has been performed among the at least two sub panels by using the factorization result.

According to another aspect of the present invention, there is provided a method for QR-factorizing matrix on a multiprocessor system, wherein the multiprocessor system comprises at least one core processor and a plurality of accelerators, the method comprising: iteratively factorizing each panel in the matrix until the whole matrix is factorized; wherein in each iteration, the method comprises: determining whether the dimension of an unprocessed matrix part in the matrix is less than a first threshold, if so, then partitioning the unprocessed matrix part into a plurality of blocks according to a first predetermined block size; and performing QR factorization on a current processed panel in the unprocessed matrix part with the core processor without initiating the plurality of accelerators, wherein the current processed panel is composed of a plurality of blocks; otherwise, determining whether the dimension of the unprocessed matrix part is greater than the first threshold and less than a second threshold, if so, then partitioning the unprocessed matrix part into a plurality of blocks according to the first predetermined block size; distributing all matrix data required for QR factorization on a current processed panel in the unprocessed matrix part from a main memory of the multiprocessor system to the plurality of accelerators, wherein the current processed panel is composed of a plurality of blocks; and coordinating each of the plurality of accelerators to obtain the distributed data locally or from the other accelerators so as to perform the QR factorization on the current processed panel; otherwise: partitioning the unprocessed matrix part into a plurality of blocks according to a second predetermined block size; partitioning a current processed panel in the unprocessed matrix part into at least two sub panels, wherein the current processed panel is composed of a plurality of blocks; and performing QR factorization one by one on the at least two sub panels with the plurality of accelerators, and updating the data of the sub panel(s) on which no QR factorization has been performed among the at least two sub panels by using the factorization result.

According to yet another aspect of the present invention, there is provided an apparatus for QR-factorizing matrix on a multiprocessor system, wherein the multiprocessor system comprises at least one core processor and a plurality of accelerators, the apparatus factorizes each panel in the matrix iteratively until the whole matrix is factorized, the apparatus comprising: a block partitioning unit configured to, in each iteration, partition an unprocessed matrix part in the matrix into a plurality of blocks according to a predetermined block size; a panel partitioning unit configured to, in each iteration, partition a current processed panel in the unprocessed matrix part into at least two sub panels, wherein the current processed panel is composed of a plurality of blocks; and a sub panel processing unit configured to, in each iteration, perform QR factorization one by one on the at least two sub panels with the plurality of accelerators, and update the data of the sub panel(s) on which no QR factorization has been performed among the at least two sub panels by using the factorization result.

According to further another aspect of the present invention, there is provided an apparatus for QR-factorizing matrix on a multiprocessor system, wherein the multiprocessor system comprises at least one core processor and a plurality of accelerators, the apparatus factorizes each panel in the matrix iteratively until the whole matrix is factorized, the apparatus comprising: a conventional QR factorization unit configured to partition an unprocessed matrix part in the matrix into a plurality of blocks according to a first predetermined block size and perform QR factorization on a current processed panel in the unprocessed matrix part with the core processor, wherein the current processed panel is composed of a plurality of blocks; a first solution module configured to partition the unprocessed matrix part into a plurality of blocks according to the first predetermined block size, and distribute all matrix data required for QR factorization on a current processed panel in the unprocessed matrix part from a main memory of the multiprocessor system to the plurality of accelerators and coordinate each of the plurality of accelerators to obtain data locally or from the other accelerators to perform the QR factorization on the current processed panel, wherein the current processed panel is composed of a plurality of blocks; a second solution module configured to, partition the unprocessed matrix part into a plurality of blocks according to a second predetermined block size and partition a current processed panel in the unprocessed matrix part into at least two sub panels, perform QR factorization one by one on the at least two sub panels with the plurality of accelerators, and update the data of the sub panel(s) on which no QR factorization has been performed among the at least two sub panels by using the factorization result, wherein the current processed panel is composed of a plurality of blocks; and a selection unit configured to, in each iteration, determine whether the dimension of the unprocessed matrix part in the matrix is less than a first threshold, if so, then initiate the conventional QR factorization unit with respect to the unprocessed matrix part, otherwise, determine whether the dimension of the unprocessed matrix part is greater than the first threshold and less than a second threshold, and if so, then initiate the first solution module with respect to the unprocessed matrix part, otherwise initiate the second solution module with respect to the unprocessed matrix part.

BRIEF DESCRIPTION OF THE DRAWINGS

It is believed that the features, advantages and purposes of the present invention will be better understood from the following description of the detailed implementation of the present invention read in conjunction with the accompanying drawings, in which:

FIG. 2 is a flowchart of the existing panel QR factorization solution;

FIG. 8 shows several matrix partitioning manners;

DETAILED DESCRIPTION OF THE INVENTION

Next, a detailed description of the preferred embodiments of the present invention will be given with reference to the drawings.

Figure 1A:
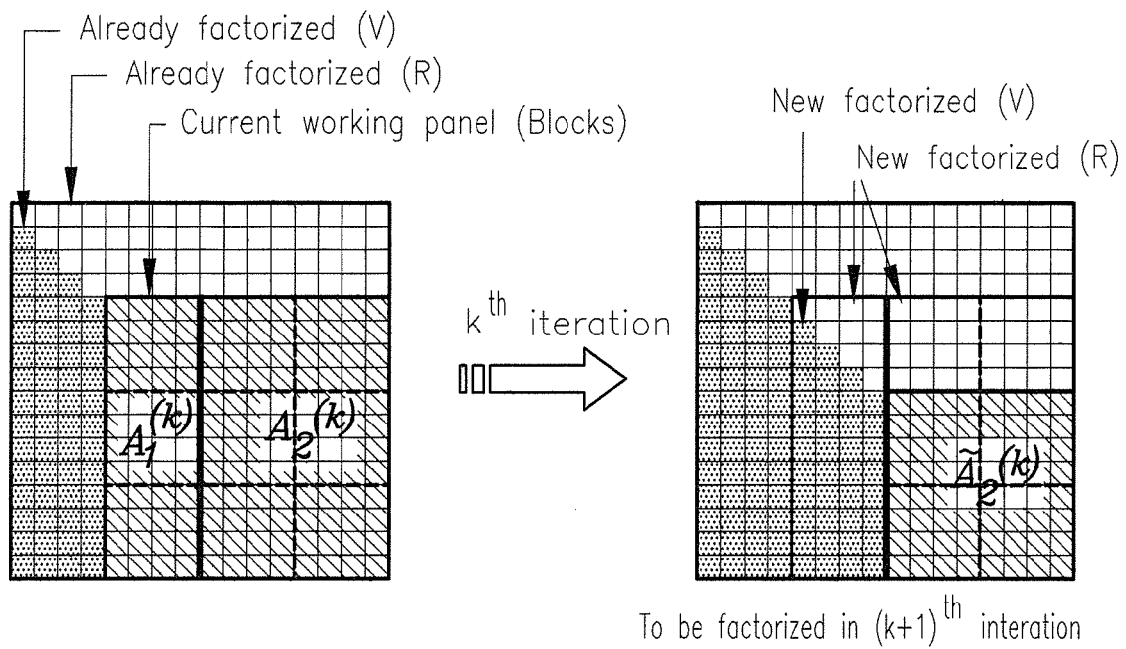
FIG. 1 is an illustration of the existing panel QR factorization solution.
Figure 1B:
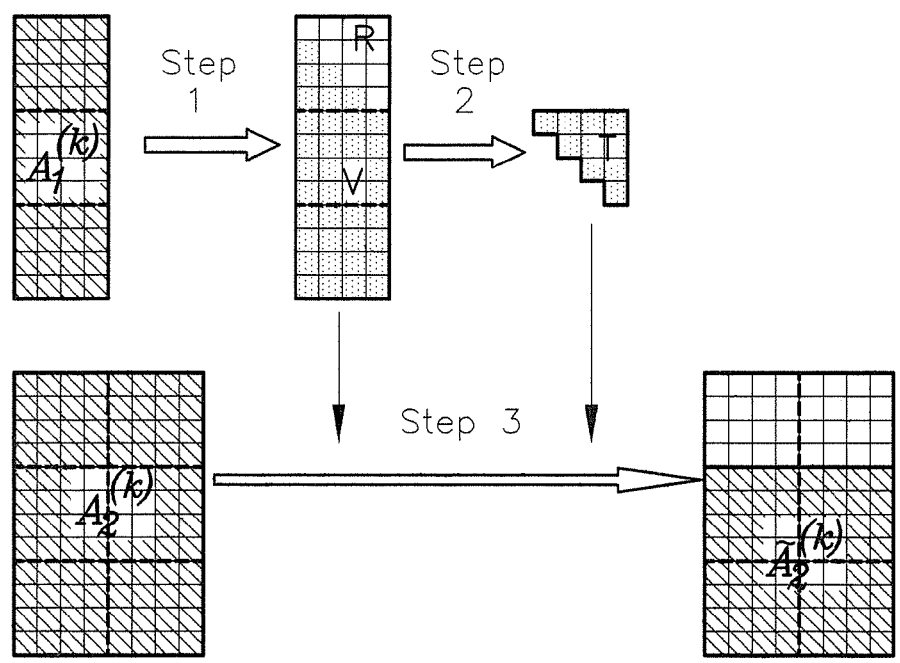
Figure 3A:
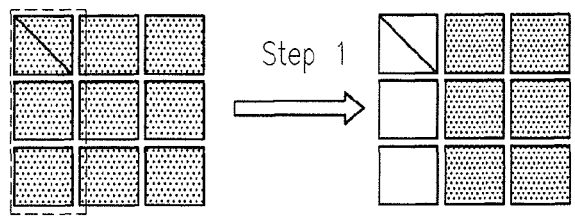
FIG. 3 shows a process of QR-factorizing a matrix of 3×3 blocks with the existing panel QR factorization solution.
Figure 3B:
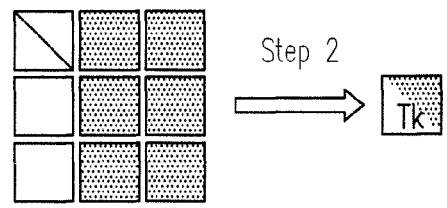
Figure 3C:
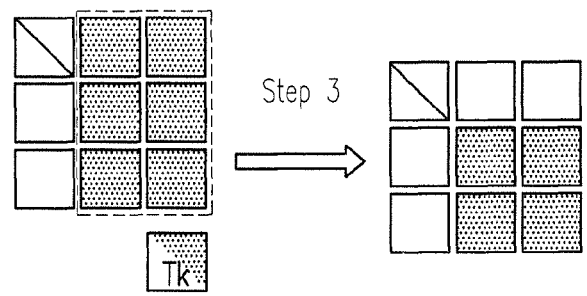
Figure 4:
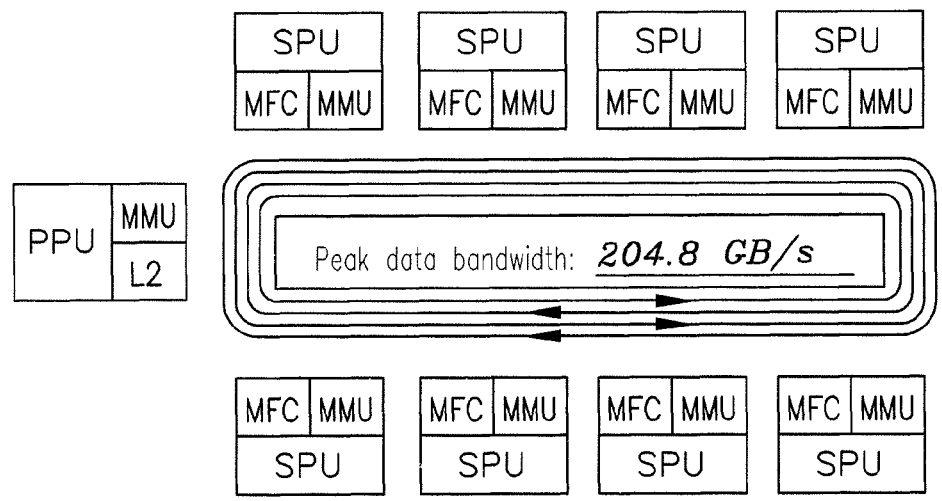
FIG. 4 is a block diagram of CBE system.
Figure 5:
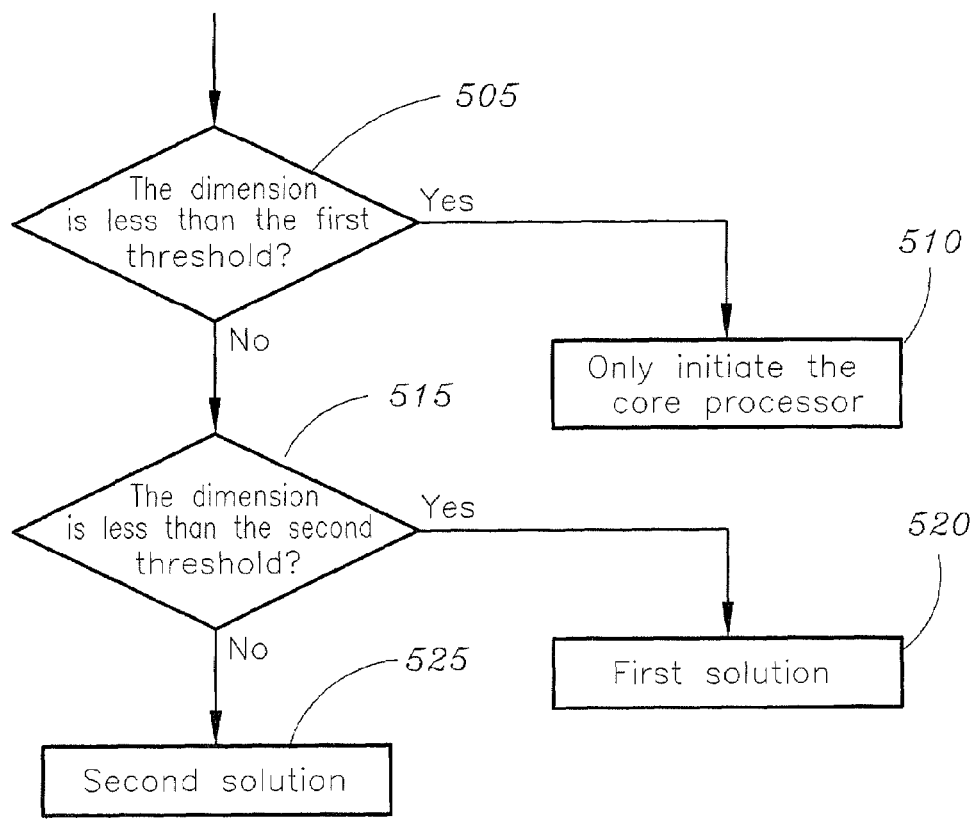
FIG. 5 is a flowchart of a method for QR-factorizing matrix on a multiprocessor system according to an embodiment of the present invention.

FIG. 5 is a flowchart of a method for QR-factorizing matrix on a multiprocessor system according to an embodiment of the present invention. Herein, the multiprocessor system has at least one core processor and a plurality of accelerators. Specifically, the multiprocessor system may be the CBE having a PPU (core processor) and 8 SPUs (accelerators), for example.

Figure 6:
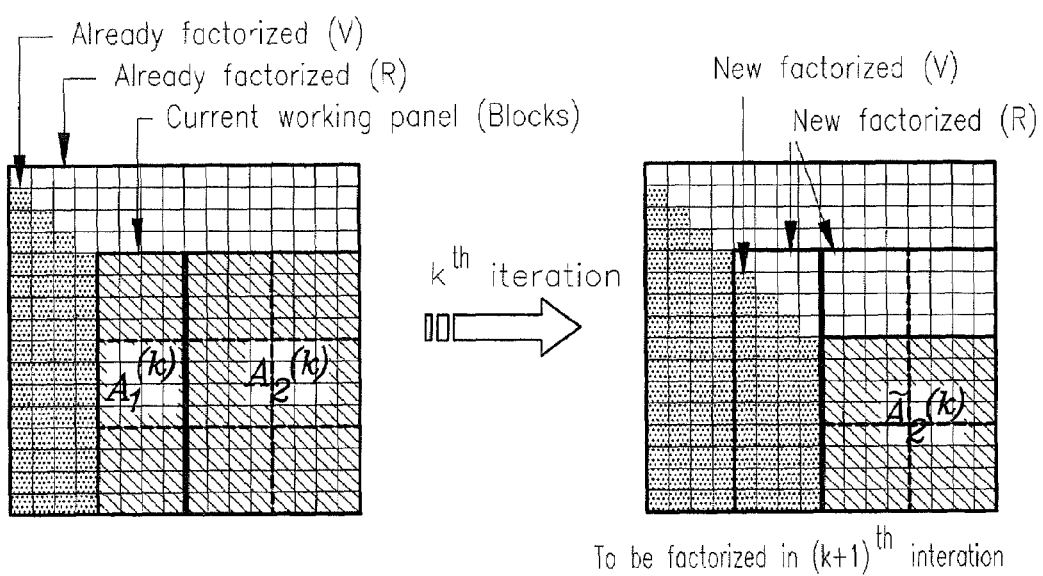
FIG. 6 is an illustration of the method for QR-factorizing matrix on a multiprocessor system according to an embodiment of the present invention.

The method for QR-factorizing matrix on a multiprocessor system of the present embodiment, for a given M×N matrix A, iteratively, performs factorization operation on one panel of the matrix at one time, to finally factorize the matrix A into the product of an M×N matrix V and an M×N upper triangular matrix R, and then computes on the M×N matrix V to obtain an M×M matrix Q, thus completing the QR factorization. Therein, as shown on the left side of FIG. 6, the matrix parts V and R in light grey are ones that have been factorized through the $1^{th} \sim (k-1)^{th}$ iteration operations, while the matrix part in dark grey combined by the matrix parts $A_1^{(k)}$ and $A_2^{(k)}$ is not factorized and is also the object of the $k^{th}$ (k=1, 2, 3 ...) iteration operation. Further, the matrix on the right side of FIG. 6 is that obtained after the $k^{th}$ iteration operation, wherein the matrix part $\tilde{A}_2^{(k)}$ in dark grey becomes the factorization object of the $(k+1)^{th}$ iteration operation.

Specifically, the method for QR-factorizing matrix on a multiprocessor system of the present embodiment performs the following steps 505~525 in the $k^{th}$ (k=1, 2, 3 ...) iteration operation.

As shown in FIG. 5, at step 505, for the unprocessed matrix part in the M×N matrix A, i.e., the object of the iteration operation this time, it is determined whether its dimension is less than a first threshold. If so, then the process turns to step 510, otherwise the process proceeds to step 515.

Therein the first threshold is determined based on the size of the communication bandwidth among the plurality of accelerators in the multiprocessor system. In the present embodiment, it may be 256, for example.

At step 510, the dimension of the unprocessed matrix part being less than the first threshold indicates the unprocessed matrix part becomes a relatively small matrix; therefore, QR factorization is performed thereon by only using the core processor of the multiprocessor system (PPU in the case of CBE). Therein, the QR factorization can be performed according to the existing panel QR factorization solution, i.e., firstly, the unprocessed matrix part is partitioned into a plurality of blocks, among which the size of each block may be 32×32; then, a current working panel composed of a plurality of blocks is partitioned out therefrom, and QR factorization is performed thereon; and then, the rest matrix data is updated with the factorization result of the current working panel.

In addition, in the embodiment, the reason for the core processor instead of the accelerators being initiated for a relatively small matrix of less than 256 dimensions is for such a consideration that the time required for completing the QR computation of such a relatively small matrix of less than 256 dimensions is very short, while it also needs a certain time to initiate the plurality of accelerators such as SPUs, and under tradeoff, the employing of the accelerators can not bring a remarkable increase of the computation performance in the case of such a relatively small matrix.

In addition, it should be noted that, in the present embodiment, although 256 dimensions are taken as a criterion for measuring whether an unprocessed matrix part becomes a relatively small matrix, a person skilled in the art should appreciate that it is only illustrative instead of limitative. According to the teaching of the present specification, any other suitable value can be taken as the criterion for measuring a relatively small matrix based on circumstances in specific implementations.

Next, at step 515, in the case that the dimension of the unprocessed matrix part is greater than the first threshold, it is determined whether the dimension is less than a second threshold. If so, the process turns to step 520, otherwise the process proceeds to step 525.

Therein, the second threshold is a value determined based on the total capacity of the local memories of the plurality of accelerators. Specifically, the second threshold is set based on such a consideration that all matrix data required for an iteration operation can be distributed into the local memories of the plurality of accelerators when performing QR factorization with the plurality of accelerators is not needed to read data from the main memory during the process of the iteration operation. For example, in the case of CBE having 8 SPUs, since the capacity of the local memory of each SPU is 256K bytes, the total capacity of the local memories of the 8 SPUs will be 256K*8=2048K bytes. Therefore, the second threshold may be set as 2K, enabling the data required for an iteration operation to be completely distributed into the local memories of the 8 SPUs.

Of course, it should be appreciated by a person skilled in the art that 2K is only illustrative instead of limitative, and according to the teaching of the specification, any other suitable value can be adopted based on circumstances in specific implementations.

Figure 7:
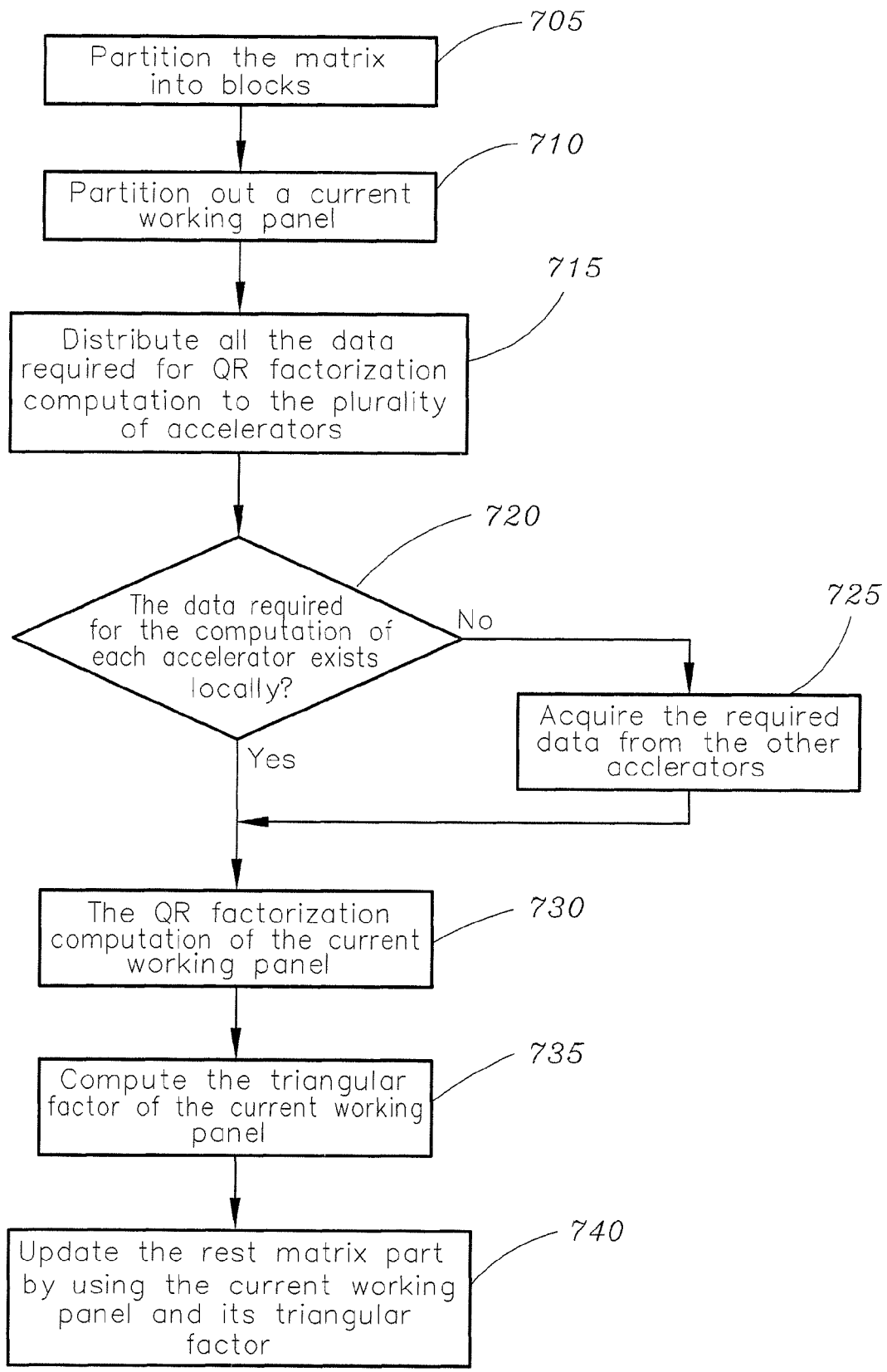
FIG. 7 is a flowchart of the first solution in FIG. 5.

At step 520, the first solution shown in FIG. 7 is adopted to QR-factorizing the unprocessed matrix part whose dimension is greater than the first threshold and less than the second threshold.

Figure 10:
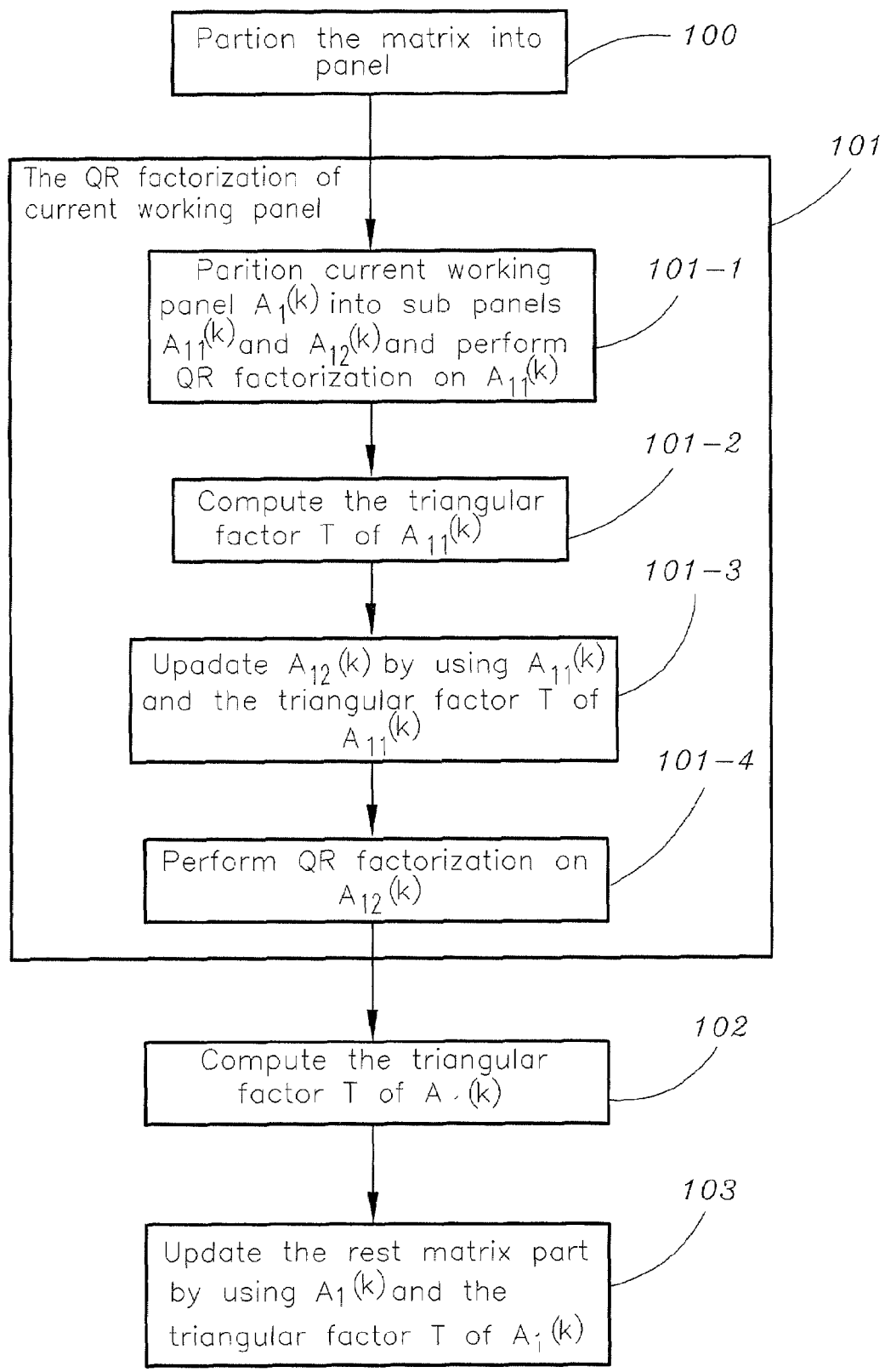
FIG. 10 is a flowchart of the second solution in FIG. 5.

At step 525, the dimension of the unprocessed matrix part being greater than the second threshold indicates the unprocessed matrix part is a relatively large matrix, thus the second solution shown in FIG. 10 is adopted to QR-factorizing it.

FIG. 7 is a flowchart of the first solution of QR-factorizing matrix on the multiprocessor system according to an embodiment of the present invention.

The first solution of the present embodiment is used for QR-factorizing the current working panel of the matrix whose dimension is greater than the first threshold such as 256 and less than the second threshold such as 2K on the multiprocessor system such as CBE.

Specifically, in the first solution of the present embodiment, in an iteration operation, as shown in FIG. 7, first at step 705, the unprocessed matrix part is partitioned into a plurality of blocks, where the size of each block may be 32×32.

Then at step 710, as the existing panel QR factorization solution, a current working panel composed of a plurality of blocks is partitioned out from the unprocessed matrix part so as to perform QR factorization thereon. However, what is different is that the first solution of the present embodiment implements the process of QR factorization by using the plurality of accelerators together, so before performing the QR factorization, steps 715-725 of distributing the data required for the QR factorization should be performed first.

At step 715, the matrix data required for the QR factorization operation of the current working panel is all distributed from the main memory of the multiprocessor system into the local memory of the plurality of accelerators.

Since as mentioned above, the second threshold is set based on such a consideration that all matrix data required for an iteration operation can be distributed into the local memories of the plurality of accelerators when performing QR factorization with the plurality of accelerators is not needed to read data from the main memory during the process of the iteration operation, under the guarantee of the second threshold, all the data required for the QR factorization operation of the current working panel can be distributed into the local memories of the plurality of accelerators.

Figures 8A, 8B, 8C, 8D, 8E:
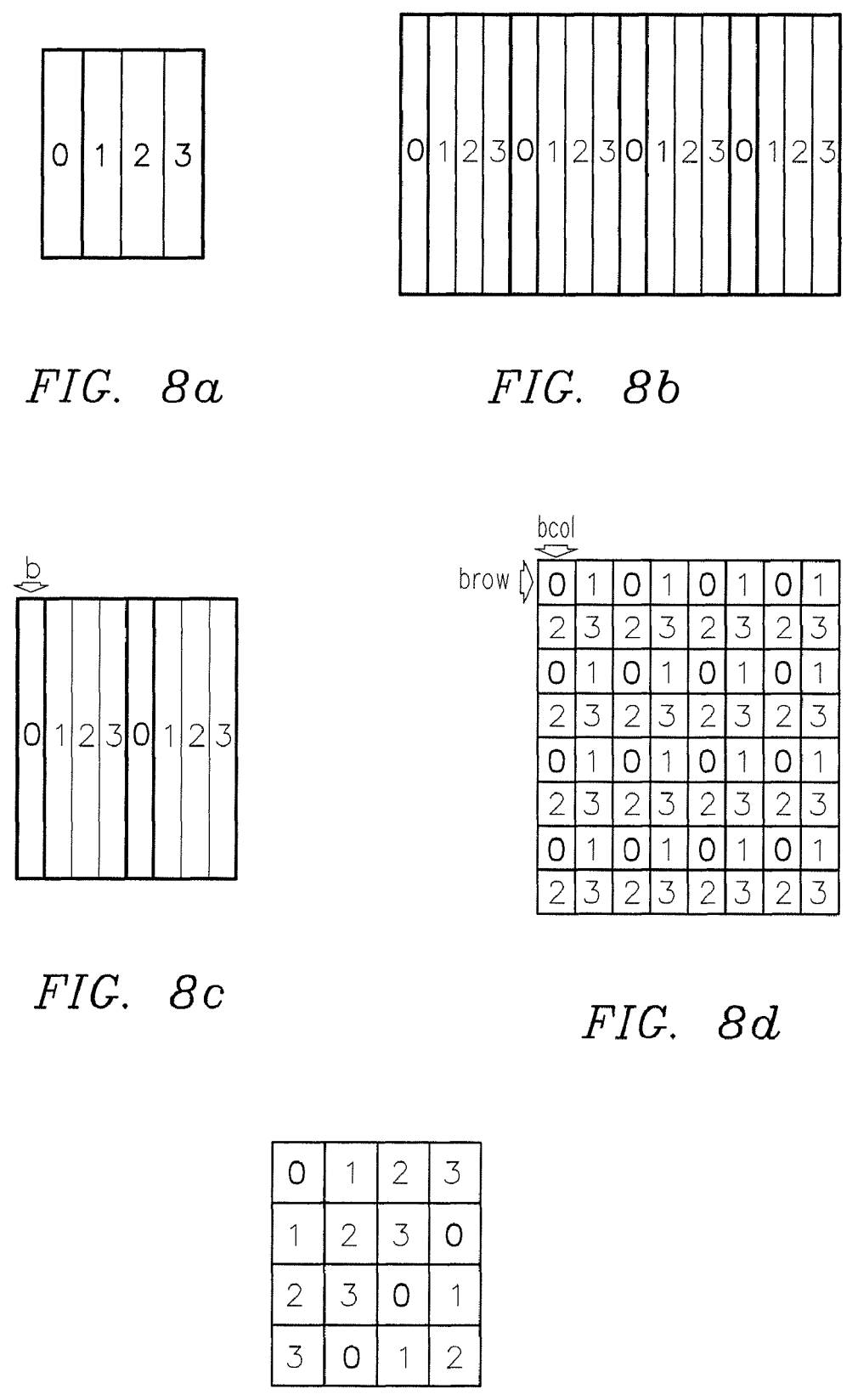

In addition, in order to implement the distribution of matrix data, FIGS. 8(a)-(e) show several manners of partitioning the matrix part needed to be distributed (what is shown in FIG. 8 is a case of partitioning into four parts to be distributed to four accelerators). Therein, matrix parts with a same reference numeral will be distributed to a same accelerator. Specifically, FIG. 8(a) shows a column block partitioning manner, that is, the matrix part needed to be distributed is partitioned into equal column blocks according to the number of accelerators; FIG. 8(b) shows a column-wise periodic partitioning manner; FIG. 8(c) shows a column-wise periodic block partitioning manner; FIG. 8(d) shows a row-column periodic block partitioning manner; and FIG. 8(e) shows a block skewed layout manner.

In the present embodiment, the matrix data required for the QR factorization computation of the current working panel is partitioned by using the row-column periodic block partitioning manner shown in FIG. 8(d) preferably to be distributed to the plurality of accelerators which perform the QR factorization simultaneously on the current panel. Of course, it is not limited to this, in a specific implementation, the manner shown in FIGS. 8(a), (b), (c) or (e) may be adopted based on circumstance.

Next at step 720, it is determined, for each of the accelerators, whether the data required for the computation by the accelerator exists in the local memory of the accelerator. If not exist, the process turns to step 725, otherwise proceeds to step 730.

In the first solution, since the QR factorization of the current working panel is performed by the plurality of accelerators jointly, each accelerator will bear the computation of a part of the data. Therefore, before each accelerator performs the computation of itself, it should be first ensured that the data part which the accelerator is responsible to compute exists in the local memory of the accelerator.

At step 725, for the accelerators for which the computation data do not exist in their local memories, the local memories of the other accelerators are searched for the required computation data by way of DMA.

Figure 9:
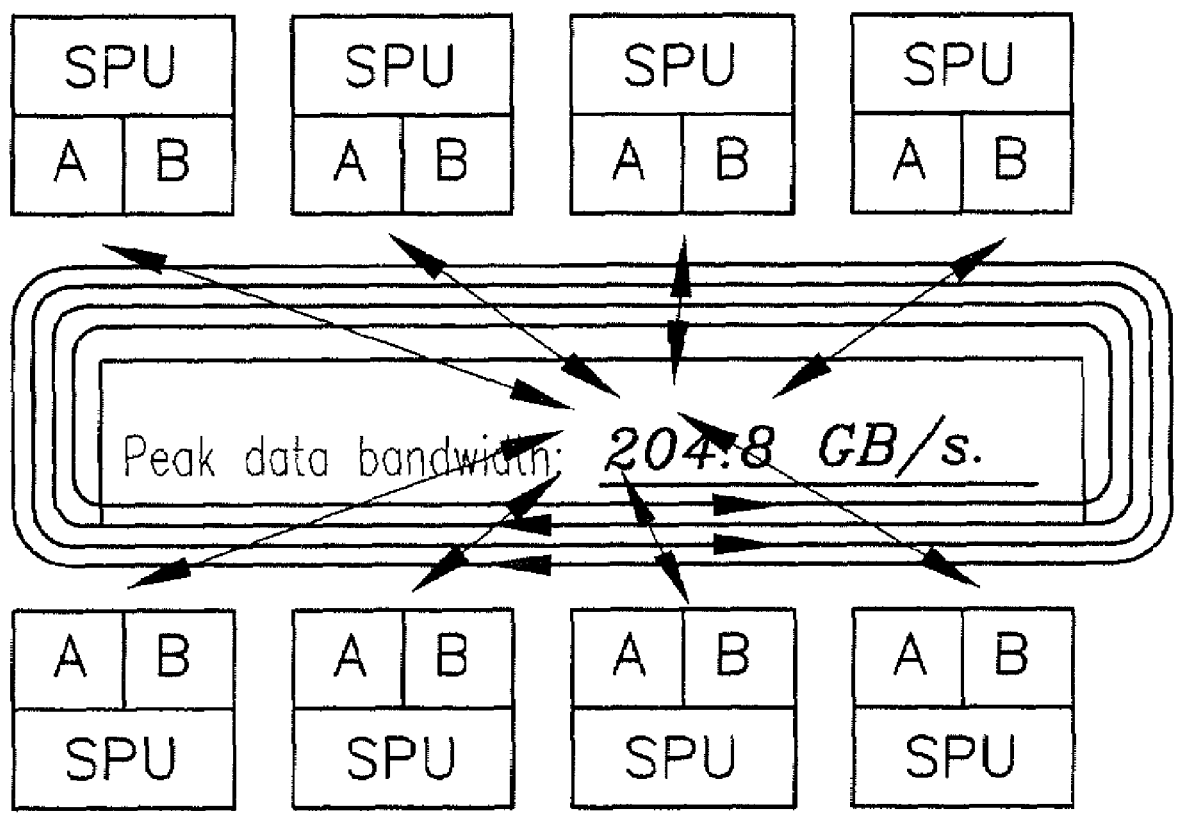
FIG. 9 is a block diagram of CBE system where the local memory of each SPU is divided into two parts.

In an embodiment of the present invention, as shown in FIG. 9, the local memory of each accelerator such as SPU may be divided into two parts A and B, to store the matrix data distributed from the main memory of the multiprocessor system and the matrix data read from the local memories of the other accelerators by way of DMA, respectively.

At step 730, the plurality of accelerators are coordinated to perform the QR factorization computation of the current working panel by using the data obtained from their local memories or the local memories of the other accelerators.

At step 735, based on the computation result of step 730, the plurality of accelerators are coordinated to compute the triangular factor of the current working panel.

At step 740, the current working panel and the triangular factor of the current working panel are applied to update the rest matrix part except the current working panel in the unprocessed matrix part.

Therein, in the computation process of steps 730 and 735, the computation results should be inter-communicated in real time among the plurality of accelerators so as to ensure the unification of the computations.

The above is a detailed description of the first solution for QR-factorizing matrix on the multiprocessor system of the present embodiment. In the first solution, in the case that the dimension of the matrix is less than the second threshold, all the matrix data required for the QR factorization computation of the current working panel is distributed into the local memories of the accelerators, and when required data is not in the local memory of a accelerator itself, the data are read from the local memories of the other accelerators by way of DMA instead of being read from the main memory of the system by way of DMA. Thus, since the bandwidth of the interconnection among the accelerators such as SPUs is 204.8 GB/s which is much greater than the bandwidth of 25.6 GB/s between the SPUs and the main memory, so the DMA overhead in the QR factorization can be greatly reduced, and the problem that the memory bandwidth requirement in the QR factorization process is greater than the memory bandwidth which can be provided by the system can be avoided.

FIG. 10 is a flowchart of the second solution for QR-factorizing matrix on the multiprocessor system according to an embodiment of the present invention, and FIG. 11 is an illustration of the second solution.

The second solution of the present embodiment is used for QR-factorizing the current working panel of the relatively large matrix whose dimension is greater than the second threshold such as 2K on the multiprocessor system such as CBE.

Specifically, in the second solution of the present embodiment, in an iteration, as shown in FIG. 10, first at step 100, the unprocessed matrix part is partitioned into m×n blocks where the size of each block is $N_b \times N_b$. In the present embodiment, the $N_b \times N_b$ is 64×64, for example.

That is, compared to the existing panel QR factorization solution, in the second solution of the present embodiment, the size of each block of the matrix is increased. The reason is the increase of the size of the blocks can lower the memory bandwidth requirement between the main memory of the system and the accelerators. As mentioned above, in the case that the block size is 32×32, the memory bandwidth requirement for performing the QR factorization with 8 SPUs will be 20.6 GB/s. In the case that the block size is 64×64, the memory bandwidth requirement will be lowered to 18.4 GB/s, which is completely bearable for such a multiprocessor system as CBE which can sustain a memory bandwidth of about 20.5 GB/s.

Next, after the block partition, in the second solution of the present embodiment, the following steps 101-103 will be performed according to:

$$A^{(k)} = \begin{pmatrix} A_1^{(k)} & A_2^{(k)} \end{pmatrix}$$

$$= \begin{pmatrix} A_{11} & A_{12} \\ A_{21} & A_{22} \end{pmatrix}$$

$$= Q \cdot \begin{pmatrix} R_{11} & R_{12} \\ 0 & R_{22} \end{pmatrix}$$

At step 101, with reference to FIG. 6, QR factorization is performed on the current working panel $A_1^{(k)}$ of the unprocessed matrix part $A^{(k)}$, so as to factorize the current working panel $A_1^{(k)}$ into part V and part R.

Figure 11A:
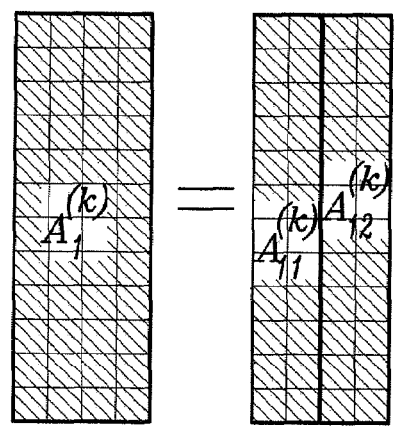
FIG. 11 is an illustration of the second solution in FIG. 5.
Figure 11B:
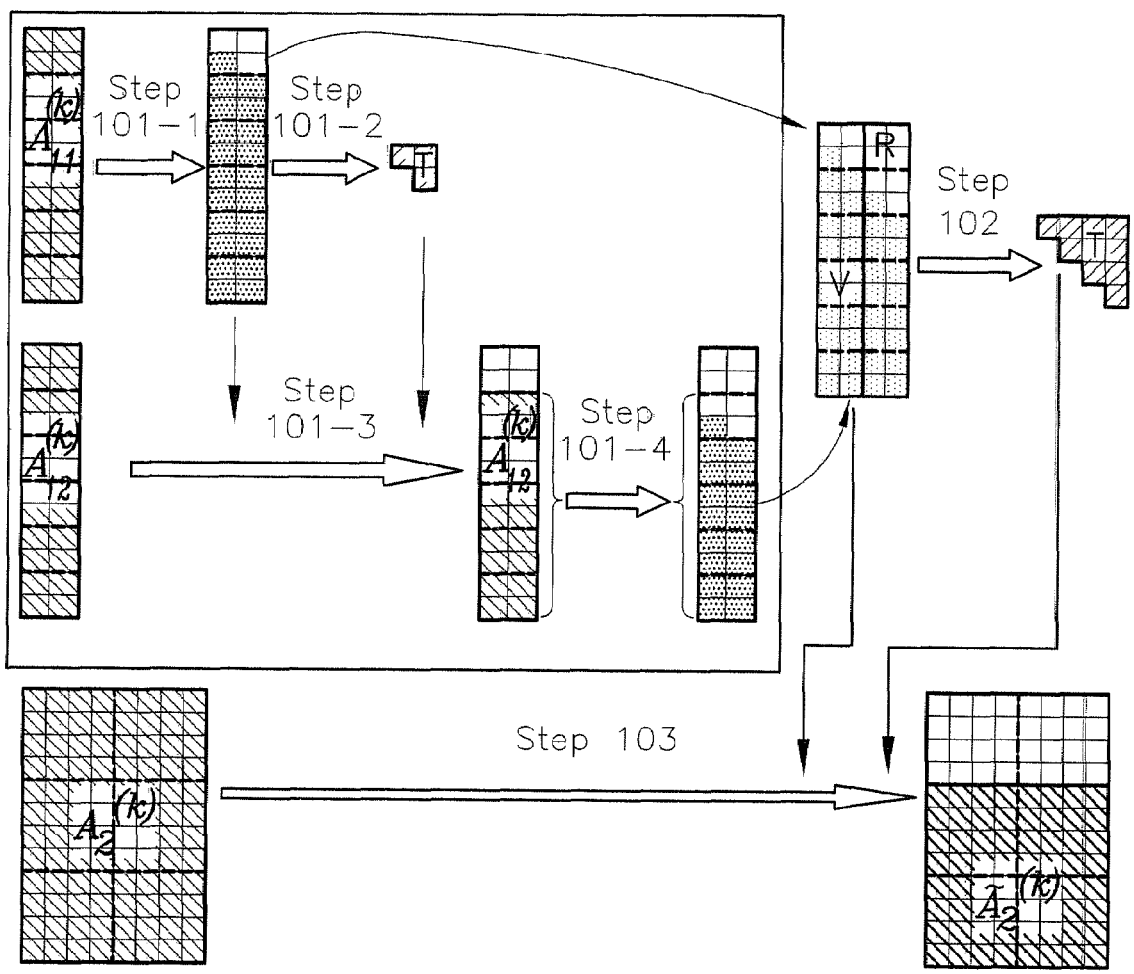

Specifically, at sub step 101-1 of step 101, the panel $A_1^{(k)}$ composed of $m \times n_b$ blocks is partitioned out from the unprocessed matrix part $A^{(k)}$ as the current working panel, and as shown in FIG. 11(a), the current working panel $A_1^{(k)}$ is further partitioned into left and the right two sub panels $A_{11}^{(k)}$ and $A_{12}^{(k)}$ in a same size, and as shown in FIG. 11(b), the plurality of accelerators are coordinated to perform QR factorization computation on the left sub panel $A_{11}^{(k)}$.

At sub step 101-2 of step 101, based on the computation result of step 101-1, the plurality of accelerators are coordinated to compute the triangular factor T of the left sub panel $A_{11}^{(k)}$.

At sub step 101-3 of step 101, the left sub panel $A_{11}^{(k)}$ and the triangular factor T of $A_{11}^{(k)}$ are applied to the right sub panel $A_{12}^{(k)}$, to update the data of the right sub panel $A_{12}^{(k)}$.

At sub step 101-4 of step 101, the plurality of accelerators are coordinated to perform QR factorization computation on the updated right sub panel $A_{12}^{(k)}$.

At step 102, based on the computation result of step 101, the plurality of accelerators are coordinated to compute the triangular factor T of the current working panel $A_1^{(k)}$.

At step 103, the current working panel $A_1^{(k)}$ and the triangular factor T of $A_1^{(k)}$ are applied to the rest matrix part $A_2^{(k)}$ of $A^{(k)}$ to update the data of the matrix part $A_2^{(k)}$. Further, in the updated matrix, as shown in FIG. 11(b), the matrix part $\tilde{A}_2^{(k)}$ in dark grey becomes the object of the $(k+1)^{th}$ iteration operation.

That is, in the second solution of the present invention, the current working panel $A_1^{(k)}$ as the object for the step 1 of QR factorization computation in the existing panel QR factorization solution is further partitioned into a plurality of sub panels, and QR factorization computation is performed on each of the sub panels.

Figure 12A:
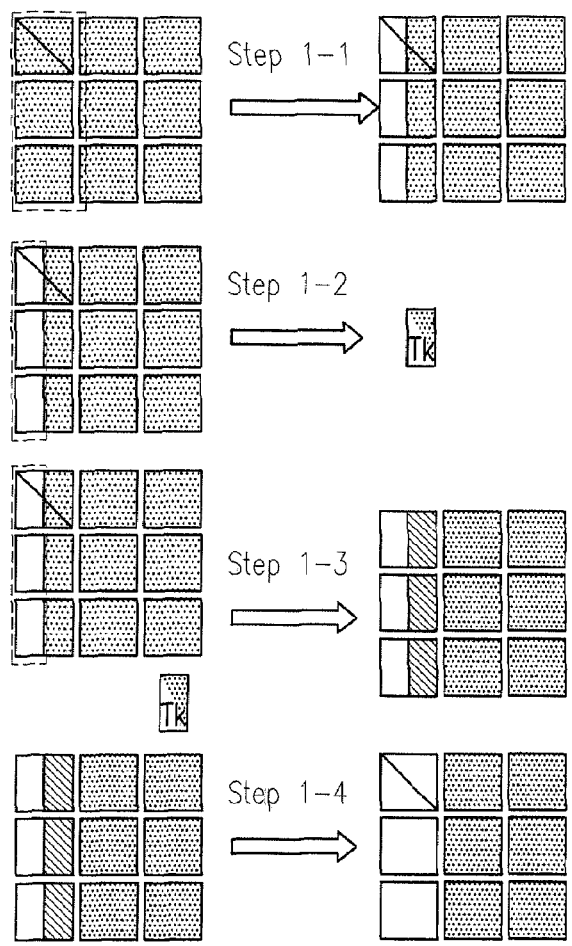
FIG. 12 shows a process of QR-factorizing a matrix of 3×3 blocks with the second solution of the present invention.
Figure 12B:
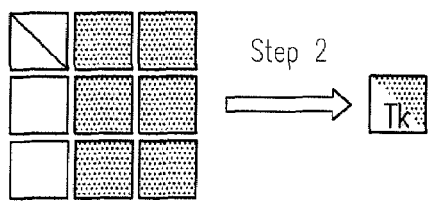
Figure 12C:
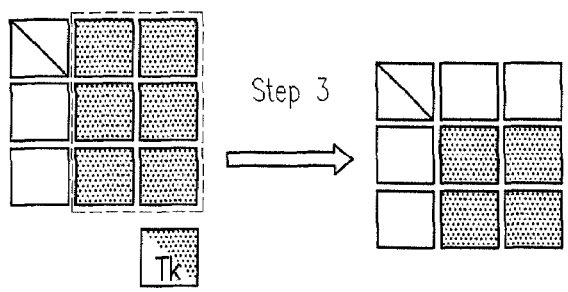

Next, by still taking a matrix of 3×3 blocks (a case of only one time iteration) as an example, the process of the second solution of the present embodiment will be described. With reference to FIG. 12(a), the second solution of the present embodiment further partitions step 1 of the existing panel QR factorization solution into 4 sub steps, where the left panel of 3×1 blocks as the object for the QR factorization computation of the step 1 is further partitioned into left and right two sub panels, and QR factorization computation is first performed on the left sub panel, the right sub panel is update by using the computation result, and then QR factorization computation is performed on the updated right sub panel. Then as shown in FIGS. 12(b) and (c), as the existing panel QR factorization solution, the triangular factor $T_k$ Of the current working panel is calculated at step 2, and the current working panel and the triangular factor $T_k$ of the current working panel are applied to the rest matrix part to update the data thereof.

The above is a detailed description of the second solution for QR-factorizing matrix on the multiprocessor system of the present embodiment. In the second solution, by increasing the size of blocks, the memory bandwidth requirement between the accelerators such as SPUs and the main memory can be lowered, and by further partitioning the current working panel as the object for the QR factorization computation into a plurality of sub panels and performing QR factorization computation on the plurality of sub panels respectively in an iteration, the complexity of the QR factorization computation caused by the increase of the size of blocks and thus the increase of the computation time can be reduced.

It should be noted that in the second solution of the present embodiment, steps 101 and 102 also involve distribution of matrix data from the main memory of the multiprocessor system to the plurality of accelerators, and in this regard, the matrix partitioning manners shown in FIG. 8 may also be adopted.

In addition, it should be further noted that in the second solution of the present embodiment, although the current working panel $A_1^{(k)}$ is further partitioned into left and right two sub panels $A_{11}^{(k)}$ and $A_{12}^{(k)}$, it is not limited to this, the current working panel $A_1^{(k)}$ may also be partitioned into more sub panels. Further, in the present embodiment, although the current working panel $A_1^{(k)}$ is partitioned into left and right two sub panels $A_{11}^{(k)}$ and $A_{12}^{(k)}$ in a same size, it is not limited to this, the current working panel may also be partitioned into sub panels in different sizes.

It should be noted that, although different QR factorization solutions are adopted based on the dimension of the unprocessed matrix in the method shown in FIG. 5, the second solution shown in FIGS. 10 and 11 may be adopted in any case without determining the dimension of the unprocessed matrix.

Under the same inventive concept, the present invention provides an apparatus for QR-factorizing matrix on a multiprocessor system, which will be described below in conjunction with the drawings.

Figure 13:
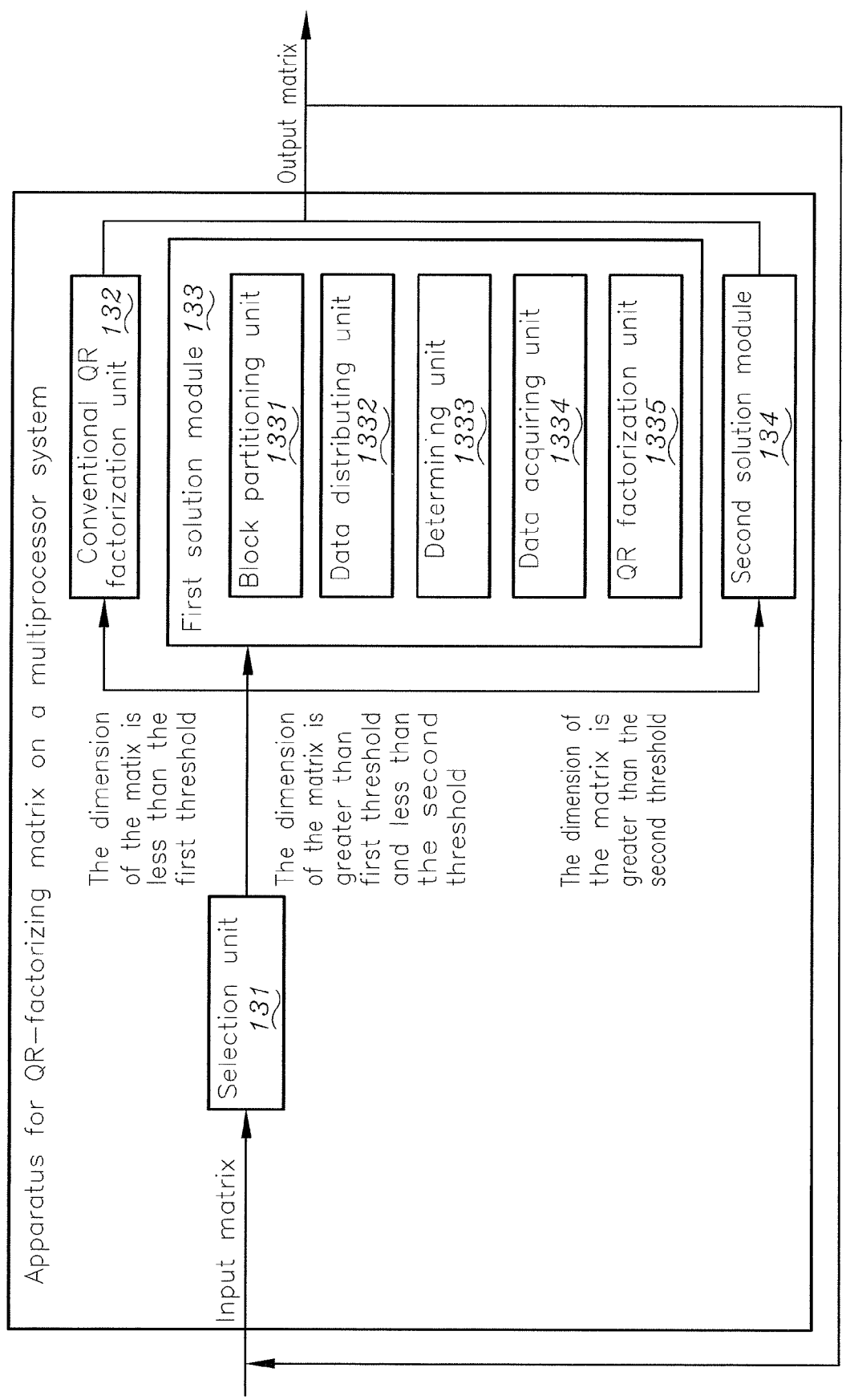
FIG. 13 is a block diagram of an apparatus for QR-factorizing matrix in a multiprocessor system according to an embodiment of the present invention.

FIG. 13 is a block diagram of an apparatus for QR-factorizing matrix on a multiprocessor system according to an embodiment of the present invention. Herein, the multiprocessor system has at least one core processor and a plurality of accelerators. Specifically, the multiprocessor system may be the CBE having a PPU (core processor) and 8 SPUs (accelerators), for example.

The apparatus for QR-factorizing matrix on a multiprocessor system of the present embodiment, for a given M×N matrix A, iteratively, performs factorization operation on one panel of the matrix at one time, to finally factorize the matrix A into the product of an M×M orthogonal matrix Q and an M×N upper triangular matrix R.

Specifically, as shown in FIG. 13, the apparatus 13 for QR-factorizing matrix on a multiprocessor system of the present embodiment comprises selection unit 131, conventional QR factorization unit 132, first solution module 133 and second solution module 134.

Therein, the selection unit 131, in each iteration, determines whether the dimension of an unprocessed matrix part (input matrix) in the matrix A is less than a first threshold, and if so, then initiates the conventional QR factorization unit 132 with respect to the unprocessed matrix part, otherwise, determines whether the dimension of the unprocessed matrix part is greater than the first threshold and less than a second threshold, if so, then initiates the first solution module 133 with respect to the unprocessed matrix part, and otherwise initiates the second solution module 134.

Preferably, the first threshold is determined based on the size of the communication bandwidth among the plurality of accelerators in the multiprocessor system, and may be 256, for example; and the second threshold is a value determined based on the total capacity of the local memories of the plurality of accelerators and may be 2K, for example.

The conventional QR factorization unit 132 partitions the unprocessed matrix part whose dimension is less than the first threshold into a plurality of blocks according to a first predetermined block size such as 32×32, and performs QR factorization operation on a current working panel composed of a plurality of blocks in the unprocessed matrix part by only initiating the core processor. That is, the conventional QR factorization unit 132 is implemented according to the above existing panel QR factorization solution.

The first solution module 133 performs QR factorization operation on the unprocessed matrix part whose dimension is greater than the first threshold and less than the second threshold by employing a first solution.

As shown in FIG. 13, the first solution module 133 may further comprise: block partitioning unit 1331 configured to partition the unprocessed matrix part into a plurality of blocks according to a predetermined block size such as 32×32; data distributing unit 1332 configured to distribute from the main memory of the multiprocessor system to the plurality of accelerators all matrix data required for performing QR factorization on a current working panel composed of a plurality of blocks in the unprocessed matrix part; determining unit 1333 configured to determine whether the data required for the computation of each of the plurality of accelerators exist locally in the accelerator; data acquiring unit 1334 configured to, for the accelerators in which the data required for the computations by them do not exist locally among the plurality of accelerators, search the other accelerators to obtain the required data; and QR factorization unit 1335 configured to coordinate the plurality of accelerators to perform the QR factorization and the computation of the triangular factor of the current working panel by using the data obtained locally or from the other accelerators, and update the matrix part other than the current working panel based on the computation result.

The second solution module 134 performs QR factorization operation on the unprocessed matrix part for which the dimension is greater than the second threshold by employing a second solution.

Figure 14:
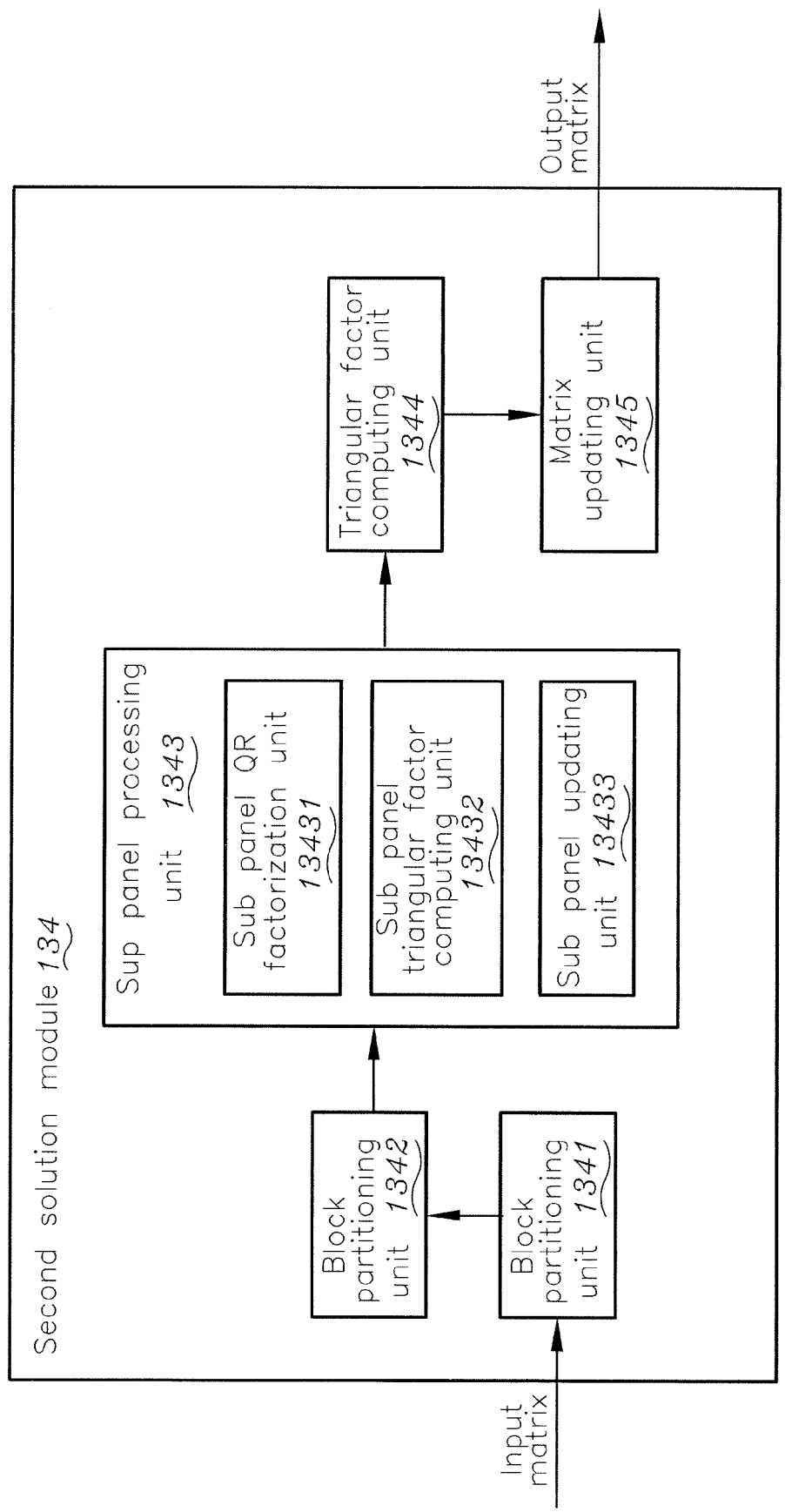
FIG. 14 is a block diagram of the second solution module in FIG. 13.

FIG. 14 is a block diagram of the second solution module for QR-factorizing matrix on the multiprocessor system according to an embodiment of the present invention.

As shown in FIG. 14, the second solution module 134 comprises block partitioning unit 1341, panel partitioning unit 1342, sub panel processing unit 1343, triangular factor computing unit 1344 and matrix updating unit 1345.

The block partitioning unit 1341 partitions the unprocessed matrix part into a plurality of blocks according to a predetermined block size such as 64×64.

The panel partitioning unit 1342 partitions a current processed panel composed of a plurality of blocks in the unprocessed matrix part into at least two sub panels. Specifically, the panel partitioning unit 1342 may partition the current processed panel into a left sub panel and a right sub panel.

The sub panel processing unit 1343 performs QR factorization one by one on the at least two sub panels with the plurality of accelerators, and updates the data of the sub panel on which the QR factorization has not been performed among the at least two sub panels by using the result of the QR factorization.

In the case that the current processed panel is partitioned into a left sub panel and a right sub panel, the sub panel processing unit 1343 may further comprise: sub panel QR factorization unit 13431 configured to perform QR factorization operation one by one on the left sub panel and the right sub panel with the plurality of accelerators; sub panel triangular factor computing unit 13432 configured to compute the triangular factor of the left sub panel based on the result of the QR factorization operation on the left sub panel after the QR factorization operation on the left sub panel is completed; and sub panel updating unit 13433 configured to update the data of the right sub panel by using the left sub panel and the triangular factor of the left sub panel, wherein the sub panel QR factorization unit 13431 performs QR factorization operation on the updated right sub panel.

The triangular factor computing unit 1344 computes the triangular factor of the current processed panel which is the whole of the at least two sub panels after the QR factorization operations on the at least two sub panels are all completed.

The matrix updating unit 1345 updates the data of the part on which no iteration operation has been performed in the matrix by using the current processed panel and the triangular factor of the current processed panel.

The above is a detailed description of the apparatus for QR-factorizing matrix on a multiprocessor system of the present embodiment. Therein, the apparatus 13 and the components thereof can be implemented with specifically designed circuits or chips or be implemented by a computer (processor) executing corresponding programs.

It should be noted that, although different QR factorization modules are initiated based on the dimension of the unprocessed matrix in the apparatus 13 shown in FIG. 13, the second solution module 134 may be initiated in any case without determining the dimension of the unprocessed matrix.

While the method and apparatus for QR-factorizing matrix on a multiprocessor system of the present invention have been described in detail with some exemplary embodiments, these embodiments are not exhaustive, and those skilled in the art may make various variations and modifications within the spirit and scope of the present invention. Therefore, the present invention is not limited to these embodiments, the scope of which is only defined by appended claims.

The invention claimed is:

1. A method for QR-factorizing matrix on a multiprocessor system, wherein the multiprocessor system comprises at least one core processor and a plurality of accelerators, the method comprising:
   iteratively factorizing each panel in the matrix until the whole matrix is factorized;
   wherein in each iteration, the method comprises:
   determining whether the dimension of an unprocessed matrix part in the matrix is less than a first threshold, if so, then
      partitioning the unprocessed matrix part into a plurality of blocks according to a first predetermined block size; and
      performing QR factorization on a current processed panel in the unprocessed matrix part with the core processor without initiating the plurality of accelerators, wherein the current processed panel is composed of a plurality of blocks;
   otherwise, determining whether the dimension of the unprocessed matrix part is greater than the first threshold and less than a second threshold, if so, then
      partitioning the unprocessed matrix part into a plurality of blocks according to the first predetermined block size;
      distributing all matrix data required for QR factorization on a current processed panel in the unprocessed matrix part from a main memory of the multiprocessor system to the plurality of accelerators, wherein the current processed panel is composed of a plurality of blocks; and
      coordinating each of the plurality of accelerators to obtain the distributed data locally or from the other accelerators so as to perform the QR factorization on the current processed panel;
   otherwise:
      partitioning the unprocessed matrix part into a plurality of blocks according to a second predetermined block size;
      partitioning a current processed panel in the unprocessed matrix part into at least two sub panels, wherein the current processed panel is composed of a plurality of blocks; and
      performing QR factorization one by one on the at least two sub panels with the plurality of accelerators, and updating the data of the sub panel(s) on which no QR factorization has been performed among the at least two sub panels by using the factorization result.

2. The method according to claim 1, wherein the first threshold is determined based on the size of communication bandwidth among the plurality of accelerators, and the second threshold is a value determined based on the total capacity of local memories of the plurality of accelerators.

3. The method according to claim 2, wherein the first threshold is 256 and the second threshold is 2K.

4. The method according to claim 1, wherein the first predetermined block size is 32×32, and the second predetermined block size is 64×64.

5. The method according to claim 1, wherein the step of distributing all matrix data required for QR factorization on a current processed panel in the unprocessed matrix part from a main memory of the multiprocessor system to the plurality of accelerators further comprises:
   distributing all the matrix data from the main memory of the multiprocessor system to the plurality of accelerators in a row-column periodic block partitioning manner.

6. The method according to claim 1, wherein the step of coordinating each of the plurality of accelerators to obtain the distributed data locally or from the other accelerators so as to perform QR factorization on the current processed panel further comprises:
   determining whether the data required for the computation of each of the plurality of accelerators exist locally in the accelerator;
   for the accelerators in which the data required for the computation by them do not exist locally among the plurality of accelerators, searching the other accelerators to obtain the required data; and
   coordinating the plurality of accelerators to perform the QR factorization of the current processed panel by using the data obtained locally or from the other accelerators.

7. An apparatus for QR-factorizing matrix on a multiprocessor system, wherein the multiprocessor system comprises at least one core processor and a plurality of accelerators, the apparatus factorizes each panel in the matrix iteratively until the whole matrix is factorized, the apparatus comprising:
   a conventional QR factorization unit configured to partition an unprocessed matrix part in the matrix into a plurality of blocks according to a first predetermined block size and perform QR factorization on a current processed panel in the unprocessed matrix part with the core processor, wherein the current processed panel is composed of a plurality of blocks;
   a first solution module configured to partition the unprocessed matrix part into a plurality of blocks according to the first predetermined block size, and distribute all matrix data required for QR factorization on a current processed panel in the unprocessed matrix part from a main memory of the multiprocessor system to the plurality of accelerators and coordinate each of the plurality of accelerators to obtain data locally or from the other accelerators to perform the QR factorization on the current processed panel, wherein the current processed panel is composed of a plurality of blocks;
   a second solution module configured to, partition the unprocessed matrix part into a plurality of blocks according to a second predetermined block size and partition a current processed panel in the unprocessed matrix part into at least two sub panels, perform QR factorization one by one on the at least two sub panels with the plurality of accelerators, and update the data of the sub panel(s) on which no QR factorization has been performed among the at least two sub panels by using the factorization result, wherein the current processed panel is composed of a plurality of blocks; and
   a selection unit configured to, in each iteration, determine whether the dimension of the unprocessed matrix part in the matrix is less than a first threshold, if so, then initiate the conventional QR factorization unit with respect to the unprocessed matrix part, otherwise, determine whether the dimension of the unprocessed matrix part is greater than the first threshold and less than a second threshold, and if so, then initiate the first solution module with respect to the unprocessed matrix part, otherwise initiate the second solution module with respect to the unprocessed matrix part.

8. The apparatus according to claim 7, wherein the first solution module further comprises:
   a data distributing unit configured to distribute all matrix data required for QR factorization on the current processed panel from the main memory of the multiprocessor system to the plurality of accelerators;

a determining unit configured to determine whether the data required for the computation of each of the plurality of accelerators exist locally in the accelerator;

a data acquiring unit configured to, for the accelerators in which the data required for the computation by them do not exist locally among the plurality of accelerators, search the other accelerators to obtain the required data; and a QR factorization unit configured to coordinate the plurality of accelerators to perform the QR factorization and the computation of the triangular factor of the current processed panel by using the data obtained locally or from the other accelerators, and update the rest matrix part based on the computation result.

* * * * *